Feb. 19, 1963   E. E. JOHNSON   3,077,669
SURVEYOR'S PIN AND PIN PICKUP
Filed July 31, 1961
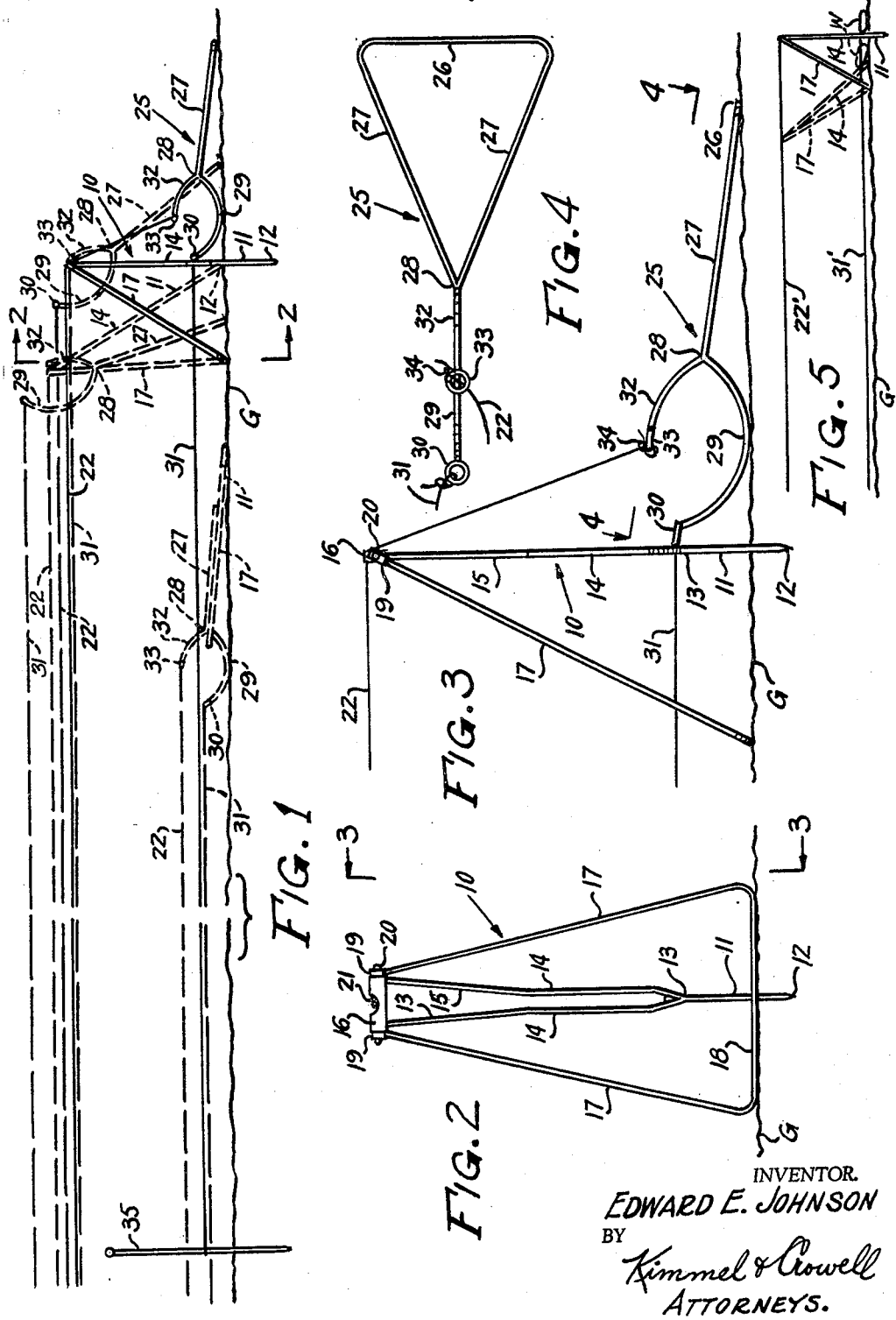
INVENTOR.
EDWARD E. JOHNSON
BY
Kimmel & Crowell
ATTORNEYS.

United States Patent Office 3,077,669
Patented Feb. 19, 1963

3,077,669
SURVEYOR'S PIN AND PIN PICKUP
Edward E. Johnson, Hastings, Nebr.
Filed July 31, 1961, Ser. No. 127,948
5 Claims. (Cl. 33—137)

This invention relates to a surveyor's pin and a pickup therefor, and has as its primary object the provision of a pin pickup which may be operated from a remote point thus obviating the necessity of a rear chainman.

An additional object of the invention is the provision of a surveyor's pin which may be positioned firmly on the ground and braced, and to which a surveyor's chain may be attached, in combination with a pickup, and a cord means which will extend to the point at the forward end of the distance being measured, the arrangement being such that a pull on the cord will release the pin pickup, and simultaneously dislodge the surveyor's pin from the ground and pick the same up so that it may be pulled forwardly by means of either the chain or the cord or both.

An additional object of the invention is the provision of such a device which is sturdy and durable in construction, reliable and efficient in operation, and relatively simple and inexpensive to manufacture and utilize, and which may be readily manipulated by a single operator.

Other objects will in part be obvious and in part be pointed out as the description of the invention proceeds, and shown in the accompanying drawing wherein there is disclosed a preferred embodiment of this inventive concept.

In the drawing:

FIGURE 1 is a side elevational view of the pin and pin pickup of the instant invention shown in operative position in full lines, to and out of positions of adjustment of the pin pickup and its associated pin being indicated in dotted lines.

FIGURE 2 is a front elevational view of a pin per se.

FIGURE 3 is a side elevational view of the pin and pin pickup shown in operative position, taken substantially along the line 3—3 of FIG. 2; and FIGURE 4 is a top plan view of the pin pickup taken substantially along the line 4—4 of FIG. 3 as viewed in the direction indicated by the arrows.

FIGURE 5 is a view similar to FIG. 1 showing the pickup of the pin as effected by a weight attached to the surveyor's chain.

Similar reference characters refer to similar parts throughout the several views of the drawing.

Having reference now to the drawings in detail, there is generally indicated at 10 a surveyor's pin, which includes a vertical member 11 provided with a point 12 adapted to be driven into the ground, and a fork 13 from which rise two parallel uprights 14, which have diverging extremities 15, between which is mounted a tubular rod 16. A brace is provided and comprises two converging side sections 17, connected by a lower horizontal ground engaging portion 18, the upper extremities of the member 17 being provided with eyes 19 through which extends a pin 20, the pin also passing through the sleeve 16. The sleeve 16 is cut away as at 21 to provide accommodation for a heavy cord or line 22, which is attached to a pin pickup member generally indicated at 25.

The pin pickup member 25 consists of a triangular drag portion including a base 26 and converging sides 27, at the apex or tip 28 of which is provided an arcuately depending member 29 which extends forwardly and is bowed downwardly in a plane perpendicular to the plane of the triangular drag member. A horizontal eye or loop 30 is provided at the outer end of the arcuate member 29, and lies in the plane of the drag sides 27. A surveyor's chain 31 is secured to the eye 30, and is adapted to be passed through the fork or crotch 13 when the device is in operative position. Extending upwardly from the apex 28 is a second arcuate member 32, which also terminates in an eye 33 which lies in a plane perpendicular to the radius of the arc of the member 32, or substantially parallel to the plane of the triangular drag member 26, and to which is attached the end 34 of the cord 22.

In the use and operation of the device the pin 11 first has its point 12 inserted in the ground, as best shown in FIG. 3, in vertical position, and the brace 17 is extended forwardly and rests against the ground surface, the latter being indicated by the reference character G. Surveyor's chain 31 is then attached to the eye 30, and the cord 22 passed loosely through the groove 21 and sleeve 16, having one end secured to the eye 33. The distance to be measured is then measured by the chain 31, the other end of which may be affixed to a suitable straight pin 35, or to another pin similar to the pin 10 previously described.

After the measurement has been completed, pressure is exerted on the line 22, which lifts the eye 33 and its associated arm 32 substantially to the first position shown in dotted lines in FIG. 1, with the lower arm 29 extending upwardly above the line 22. An additional pull on the line 22 together with a pull on the line 31 exerts a force to tilt the supporting member 17 forwardly, which raises the extremity of pin 10 upwardly to release the point 12 from its engagement in the ground. As soon as the point 12 has been disengaged, the assembly tilts forward to the final dotted line position indicated to the left in FIG. 1, and the pin, its support and the pickup may be dragged forwardly by the line 22 or 31, with the bight or fork 28 comprising the apex of the triangular drag member engaging about the sleeve 16 to support the entire assembly. When the assembly reaches the pin 35, it may be replanted, or in the event that the pin 35 is similar in construction to the previously described pin 10, the entire action may be repeated by the pickup's engagement with the associated sleeve 16 to lift the subsequent pin out of the ground.

FIGURE 5 discloses a modified form of pin pickup wherein a line 22′ is attached directly to the top of upright 14 at its juncture with brace 17 and a weight W is attached to the end of surveyor's chain 31′. Weight W wedges between uprights 14 and when pulled in conjunction with line 22′ acts in the same manner as previously described pin pickup member 25.

From the foregoing it will now be seen that there is herein provided an improved surveyor's pin and pickup therefor, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A surveyor's pin comprising a straight pointed pin member, bifurcations extending upwardly from the upper end of said pin, a rotatable sleeve between the ends of said bifurcations, a substantially triangular brace for said pin comprising a base and converging side pieces, eyes at the ends of said side pieces, and a pin extending through said eyes and said sleeve mounting said brace for pivotal movement relative to said bifurcations.

2. A surveyor's pin comprising a straight pointed pin member, bifurcations extending upwardly from the upper end of said pin, a rotatable sleeve between the ends of said bifurcations, a substantially triangular brace for said pin comprising a base and converging side pieces, eyes at the ends of said side pieces, a pin extending through said eyes and said sleeve mounting said brace for pivotal movement relative to said bifurcations, and a pickup for said pin comprising a normally horizontal drag member, an arm extending vertically upwardly from said drag member, a line secured to said arm extending over said sleeve, a second arm extending vertically downwardly from said drag member and adapted for attachment to a surveyor's chain, said last-mentioned arm having means thereon to engage said bifurcations to serve as a stop.

3. The structure of claim 2 wherein said drag member is triangular in form and said arms extend from the apex of the triangle, and said means to engage said bifurcations comprises an eye on the end of the downwardly extending arm.

4. The structure of claim 3 wherein said downwardly extending arm is arcuate and of a greater length than said upwardly extending arm and said upper arm is oppositely arcuate, said arms oppositely extending from a common point at the apex of the triangular member to engage about said sleeve to lift the same and hence pull said pin from the ground when a pull is exerted on said line.

5. A surveyor's pin and pickup apparatus comprising in combination a pointed pin member for insertion into the ground, a pair of divergent interconnected ground engaging bracing members for said pin, a pivotal interconnection between the convergent ends of said bracing members and an upper portion of said pin rotatably interconnecting said pin and said bracing members, a receiving and holding element at said pivotal interconnection, operatively related to said pin for holding a cord or line, and a drag element secured with said line for engagement with said pin to pick up said pin when a pulling force is exerted on said line.

References Cited in the file of this patent

UNITED STATES PATENTS

| | | |
|---|---|---|
| 480,154 | Van Ness | Aug. 2, 1892 |
| 1,165,459 | Sprague | Dec. 28, 1915 |